July 7, 1970 L. W. SCHREINER 3,519,887

HIGH VOLTAGE MOUNTING ASSEMBLY

Filed Sept. 15, 1967

INVENTOR
LOUIS W. SCHREINER
by: Charles W. Carter
ATTY.

United States Patent Office 3,519,887

Patented July 7, 1970

3,519,887

HIGH VOLTAGE MOUNTING ASSEMBLY

Louis W. Schreiner, Palatine, Ill., assignor to Warwick Electronics Inc., a corporation of Delaware Filed Sept. 15, 1967, Ser. No. 668,030
Int. Cl. H01r *13/50;* H02b *1/00*
U.S. Cl. 317—99 1 Claim

ABSTRACT OF THE DISCLOSURE

A unitary, insulated high voltage mounting assembly for a television receiver has a pair of communicating chambers for receiving and supporting a high voltage rectifier and a focus voltage dropping resistor. A channel is provided in the rectifier chamber for leads connecting the high voltage rectifier to external circuitry and for insulating the leads from the rectifier.

BACKGROUND OF THE INVENTION

Field of the invention

This invention relates to a unitary, insulated mounting assembly for television receivers which receives and supports a high voltage rectifier and a focus voltage dropping resistor.

FIELD OF USE

In present day television receivers, a high voltage rectifier is employed in the high voltage circuit for supplying a voltage on the order of 25 kilovolts (kv.) to the ultor of the cathode ray tube (CRT). In many of such receivers, a voltage dividing network is associated with the rectifier output for deevloping a focus voltage for the CRT, and the voltage dividing network includes a voltage dropping resistor for reducing the voltage from 25 kv. to a value on the order of 5 kv. from which the focus voltage may be derived. Because of the high voltage developed at the rectifier output and the necessary proximity of grounded objects surrounding the rectifier and the voltage dropping resistor, the rectifier and the voltage dropping resistor must be mounted in insulated housings.

DESCRIPTION OF THE PRIOR ART

In the past, it has been common to provide an insulated high voltage rectifier housing and a separate, insulated focus voltage dropping resistor housing wherein the resistor is totally enclosed. In such arrangements, the resistor enclosure has been quite expensive. No prior art is known which shows the unitary high voltage mounting assembly as disclosed and claimed herein.

SUMMARY OF THE INVENTION

This invention is directed, in brief, to the provision of a unitary, insulated mounting assembly for a high voltage rectifier and a focus voltage dropping resistor utilized in a television receiver wherein the focus voltage is developed from the high voltage output of the rectifier through the focus voltage dropping resistor. In particular, two chambers are provided in the assembly for receiving and supporting the rectifier and the resistor and the chambers communicate through an integrally formed slot to allow for electrical connection there-between. In order to provide an insulated channel for leads connecting the rectifier to external circuitry, the rectifier chamber may be provided with slots for accommodating a slidably inserted panel.

DESCRIPTION OF THE PREFERRED EMBODIMENT

Figures 1, 2, 3, 4, 5:
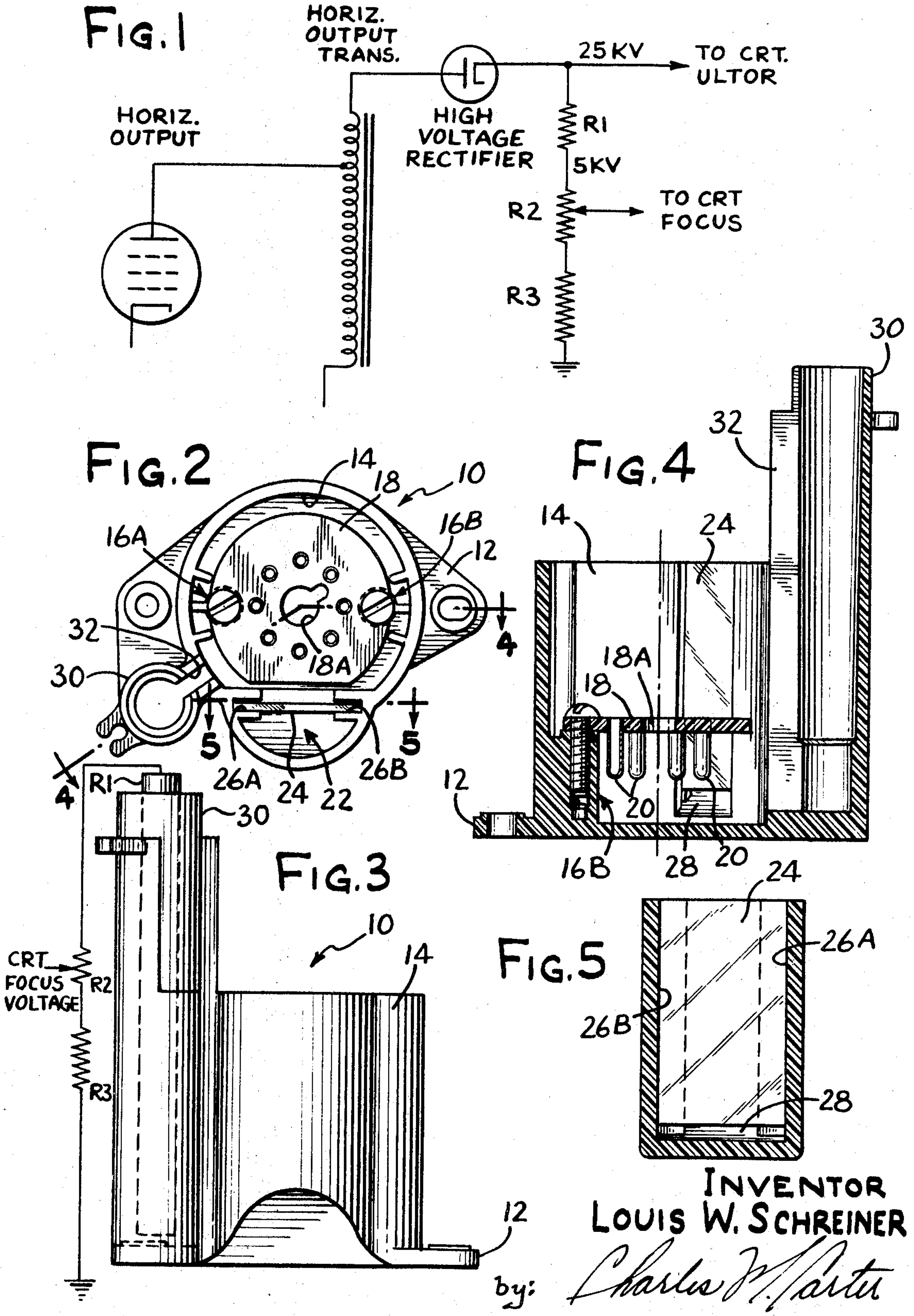
FIG. 1 is a schematic diagram illustrating high voltage and focus voltage television circuitry of the type wherein the mounting assembly constructed in accordance with the teachings of the present invention finds application.
FIG. 2 is a top plan view of a mounting assembly constructed in accordance with the teachings of the present invention.
FIG. 3 is a side elevational view of the assembly shown in FIG. 2 further showing connection to focus voltage circuitry.
FIG. 4 is a view taken along line 4—4 in FIG. 2.
FIG. 5 is a view taken along line 5—5 in FIG. 2.

Referring to FIG. 1, the basic high voltage and focus voltage circuitry for the type of television receiver in which the present invention finds application is shown. The high voltage, illustrated as 25 kv., is derived from the horizontal output transformer through a high voltage rectifier and is applied to the ultor of the cathode ray tube. The focus voltage for the CRT is derived from the 25 kv. rectifier output through a resistive voltage dividing network which includes a voltage dropping resistor R1, an adjustable focus voltage resistor R2 and a third resistor R3. In typical television circuitry of this type, the resistors are selected so that approximately 5 kv. is developed at the connection between the voltage dropping resistor R1 and the adjustable resistor R2. The focus voltage is taken off the adjustable tap of resistor R2. Since the details of this circuitry do not constitute a portion of this invention, they will not be set forth.

In accordance with the present invention, a new and improved mounting assembly has been provided for the high voltage rectifier and the voltage dropping resistor R1. A mounting assembly 10 constructed in accordance with the teachings of the present invention is shown in FIGS. 2–5. The exemplary mounting assembly 10 includes a base 12 formed of an insulating material, such as polyethylene, which allows for mounting the assembly on a television chassis.

For the purpose of receiving and supporting a high voltage rectifier tube, a first well or chamber 14 is provided which is formed of insulating material integrally with the base 12 and extends upwardly of the base. A pair of upstanding mounts 16A, 16B are provided within the chamber 14 to allow for mounting a rectifier tube receiving socket 18 within the chamber. A typical socket 18 includes a keyed opening 18A for receiving the center pin or stud of the rectifier tube. Additionally, circumferentially spaced holes are provided in the socket 18 which have terminals 20 associated therewith and which are adapted to receive tube pins when the rectifier is seated to make electrical contact between the terminals and the tube pins. The terminals may be electrically connected to external circuitry through appropriate leads to connect the rectifier to such external circuitry.

In order to isolate and shield such leads connecting the rectifier to external circuitry from the rectifier, a passageway or channel 22 is formed in the chamber 14. The passageway 22 is formed, in the exemplary arrangement, by a plate 24 which is formed of insulating material and is slidably received in slots 26A, 26B formed in the inner wall of the chamber 14. As may best be seen by reference to FIG. 5, the passageway 22 communicates with the chamber 14 below the socket 18 through an opening 28 defined below the plate 24. The plate 24 is not formed integrally with the remainder of the assembly 10 to facilitate molding of the assembly.

For the purpose of receiving and supporting a focus voltage dropping resistor R1, which in the exemplary arrangement has a cylindrical form, a tubular chamber or well 30 is provided which is formed of insulating material integrally with the base 12 and likewise extends upwardly of the base adjacent the chamber 14. In keeping with the invention, the chamber 30 communicates with the chamber 14 through a slot 32 formed in the common wall therebetween. The slot 32 extends the length of the chamber 30, in the exemplary arrangement, to facilitate molding of the assembly 10. It follows that, with the exemplary arrangement, a lead 34 from the lower terminal of the resistor R1 may be connected to the output terminal of the rectifier socket 18 through the slot 32. The upper terminal of the resistor R1 as viewed in FIG. 3 is connected to the adjustable focus voltage resistor R2.

In view of the foregoing, it will be seen that a simple, economical, unitary insulated mounting assembly has been provided for receiving and supporting both a high voltage rectifier and a focus voltage dropping resistor. Since the high voltage (25 kv.) end of the focus voltage dropping resistor communicates with the 25 kv. output of the rectifier within the insulated housing of the assembly, the necessary insulating requirements have been met without requiring an expensive, separate enclosure for totally enclosing the dropping resistor.

While the present invention has been described in accordance with a preferred embodiment, it is to be understood that the invention is not to be limited thereto but, on the contrary, is intended to cover the various modifications and equivalent arrangements included within the spirit and scope of the invention as defined by the appended claim.

I claim:

1. A composite insulated mounting assembly for a television receiver which comprises: a first chamber formed of insulating material for receiving and supporting a high voltage supply device; a second chamber formed of insulating material integrally with said first chamber for receiving and supporting a device for reducing the high voltage to a value utilizable for focus voltage control; means formed integrally with the chambers for connecting the chambers in communicating relationship to allow for connecting the high voltage supply device to the voltage reducing device within the mounting assembly; a pair of slots formed in the inner wall of said first chamber; and a plate slidably received in said slots, said plate forming a channel within said first chamber which communicates therewith for accommodating leads from the high voltage supply device and isolating said leads from the supply device.

References Cited

UNITED STATES PATENTS

| | | | |
|---|---|---|---|
| 1,973,248 | 9/1934 | Evans | 317—257 X |
| 2,448,378 | 8/1948 | Livingston et al. | 317—257 X |
| 2,472,021 | 5/1949 | Mitchell | 317—257 X |
| 3,305,702 | 2/1967 | Manetti et al. | 317—99 |
| 3,395,319 | 7/1968 | Massa et al. | 317—101 |

LARAMIE E. ASKIN, Primary Examiner

G. P. TOLIN, Assistant Examiner

U.S. Cl. X.R.

339—193